United States Patent
Ossher et al.

(10) Patent No.: US 12,197,457 B2
(45) Date of Patent: *Jan. 14, 2025

(54) CENTRAL USER INTERFACE FOR ACCESSING AND UPGRADING OF DATASET INTEGRATIONS

(71) Applicant: Palantir Technologies Inc., Denver, CO (US)

(72) Inventors: Joel Ossher, Oakton, VA (US); Ashley Einspahr, Brooklyn, NY (US); Michael Tuer, Sunnyvale, CA (US); Orr Ganel, Washington, DC (US); Ryan Hermstein, Washington, DC (US); Stephen Yazicioglu, New York, NY (US); Wenshuai Hou, Arlington, VA (US)

(73) Assignee: Palantir Technologies Inc., Denver, CO (US)

( * ) Notice: Subject to any disclaimer, the term of this patent is extended or adjusted under 35 U.S.C. 154(b) by 122 days.

This patent is subject to a terminal disclaimer.

(21) Appl. No.: 17/934,493

(22) Filed: Sep. 22, 2022

(65) Prior Publication Data

US 2023/0121615 A1 Apr. 20, 2023

Related U.S. Application Data

(63) Continuation of application No. 16/276,393, filed on Feb. 14, 2019, now Pat. No. 11,455,315.

(Continued)

(51) Int. Cl.
*G06F 16/00* (2019.01)
*G06F 3/06* (2006.01)

(Continued)

(52) U.S. Cl.
CPC .......... *G06F 16/254* (2019.01); *G06F 3/0605* (2013.01); *G06F 3/0655* (2013.01);

(Continued)

(58) Field of Classification Search
CPC .... G06F 16/254; G06F 3/0605; G06F 3/0655; G06F 3/067; G06F 9/5077; G06F 16/122;

(Continued)

(56) References Cited

U.S. PATENT DOCUMENTS

| 8,775,368 B1 | 7/2014 | Burke et al. |
| 10,334,044 B1 | 6/2019 | Bigman et al. |

(Continued)

OTHER PUBLICATIONS

U.S. Pat. No. 11,455,315, Central User Interface for Accessing and Upgrading of Dataset Integrations, Sep. 27, 2022.

*Primary Examiner* — Dinku W Gebresenbet
(74) *Attorney, Agent, or Firm* — Knobbe, Martens, Olson & Bear, LLP

(57) ABSTRACT

Systems and methods for a central user interface for accessing, and upgrading of, dataset integrations. An example method includes accessing, by a system of one or more processors, datasets stored via respective outside devices or systems. The datasets are integrated by the system according to respective integration tiers, with each integration tier being associated with, at least, a respective subset of search functionality enabled via the system. An interactive user interface is presented via a user device, with the interactive user interface presenting summary information. The interactive user interface further enables adjustment of a particular dataset from a first integration tier to a second integration tier.

20 Claims, 10 Drawing Sheets

Related U.S. Application Data

(60) Provisional application No. 62/778,175, filed on Dec. 11, 2018.

(51) Int. Cl.
  *G06F 9/50* (2006.01)
  *G06F 16/11* (2019.01)
  *G06F 16/21* (2019.01)
  *G06F 16/22* (2019.01)
  *G06F 16/25* (2019.01)
  *G06F 16/26* (2019.01)
  *G06F 16/27* (2019.01)
  *G06F 16/28* (2019.01)

(52) U.S. Cl.
  CPC ............ *G06F 3/067* (2013.01); *G06F 9/5077* (2013.01); *G06F 16/122* (2019.01); *G06F 16/214* (2019.01); *G06F 16/2272* (2019.01); *G06F 16/26* (2019.01); *G06F 16/278* (2019.01); *G06F 3/0607* (2013.01); *G06F 3/0647* (2013.01); *G06F 16/217* (2019.01); *G06F 16/283* (2019.01)

(58) Field of Classification Search
  CPC .... G06F 16/214; G06F 16/2272; G06F 16/26; G06F 16/278; G06F 3/0607; G06F 3/0647; G06F 16/217; G06F 16/283; G06F 3/0649; G06F 3/0685; G06F 3/0604; G06F 3/0653; G06F 2209/5014
  See application file for complete search history.

(56) References Cited

U.S. PATENT DOCUMENTS

| | | |
|---|---|---|
| 11,455,315 B1 | 9/2022 | Ossher et al. |
| 2004/0003063 A1 | 1/2004 | Ashok et al. |
| 2010/0095000 A1 | 4/2010 | Kettler et al. |
| 2011/0078303 A1 | 3/2011 | Li et al. |
| 2015/0058314 A1* | 2/2015 | Leclerc ............... H04L 63/0815 707/711 |
| 2016/0357447 A1 | 12/2016 | Guttahalli Krishna et al. |
| 2017/0048164 A1 | 2/2017 | Bouw et al. |
| 2017/0199989 A1* | 7/2017 | Lilko .................... G06F 21/604 |
| 2017/0373935 A1 | 12/2017 | Subramanian et al. |
| 2018/0285166 A1 | 10/2018 | Roy et al. |
| 2019/0272331 A1 | 9/2019 | Gangadhar et al. |
| 2019/0288915 A1 | 9/2019 | Denyer et al. |
| 2019/0294477 A1 | 9/2019 | Koppes et al. |
| 2019/0317808 A1* | 10/2019 | Srinivasan ............. H04L 67/12 |
| 2020/0089539 A1 | 3/2020 | Klinger et al. |
| 2020/0125566 A1 | 4/2020 | Scott |
| 2020/0125582 A1* | 4/2020 | O'Shaughnessy .... G06F 16/245 |
| 2020/0134483 A1 | 4/2020 | Bremer et al. |

* cited by examiner

CENTRAL USER INTERFACE FOR ACCESSING AND UPGRADING OF DATASET INTEGRATIONS

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

TECHNICAL FIELD

The present disclosure relates to systems and techniques for data integration, analysis, and visualization. More specifically, the disclosure relates to improved user interfaces for data integration and monitoring thereof.

BACKGROUND

Due to the rise of increasingly efficient data storage techniques, and increasingly capable storage devices, an entity may have little incentive to discard data. For example, the entity may generate large quantities of data during its normal operation. A first example portion of the data may reflect user interactions with disparate systems, devices, and so on. In this example, the entity may control one or more web pages which are accessible to end-users and monitor interactions with the web pages. A second example portion of the data may reflect automatically generated hardware, network, or software, interactions. In this example, the entity may control server systems which are configured to serve up the web pages. Maintaining the above-described data may be advantageous for the entity. For example, the data may be utilized to forecast demands for bandwidth, to improve upon usability of the web pages, and so on. Thus, the entity may leverage disparate storage techniques to ensure the data may be later analyzed.

However, performing analyses using stored data may be constrained according to an entity's ability to access the data. For example, certain data may be stored via one or more databases. As another example, certain other data may be stored in cloud-based storage systems. Each of the above-described example storage schemes may have a distinct scheme to access, and utilize, the data. With respect to the databases, a user associated with the entity may execute different commands or queries to generate analyses. With respect to the cloud-based storage system, the user may be constrained according to any analysis functionality built into the cloud-based storage system. Thus, performing analyses using data stored by the cloud-based storage system and databases may be impractical.

SUMMARY

As will be described, a system may centrally integrate datasets associated with an entity. For example, the datasets may be stored by disparate devices, outside database systems, cloud-based storage systems, and the system may integrate them. The central integration of these datasets may rapidly allow for the entity to perform complex analyses across the entirety of the integrated datasets. For example, a user associated with the entity may perform search-based analyses using the integrated datasets. Since these analyses may consume resources of the system, such as virtualized processing or memory resources, the user may reserve certain quantities, thresholds, or ranges, of such resources. Determining whether these reserved resources are in line with usage of the datasets, may present technological difficulties. For example, a particular dataset may be of rare importance during searches initiated by users associated with the entity. In this example, the particular dataset may require substantial processing or storage resources of the system. Thus, in this example, the entity may benefit from having the system utilize less resources for this particular dataset.

Advantageously, a central user interface described herein may present summary information associated with datasets integrated by the system. The summary information may reflect usage information for the integrated datasets. As will be described, datasets may be integrated according to different integration tiers of a hierarchy of integration tiers. Each integration tier may indicate a subset of functionality performable by the system with respect to an integrated dataset. With an increase in functionality, the system may be correspondingly required to utilize additional resources. For example, an increase in functionality may require additional processing resources (e.g., virtualized processors) to perform the increased functionality. As another example, an increase in functionality may require additional memory resources. Thus, since this functionality may utilize resources of the system, it may be difficult for an entity to determine which integration tier is to be assigned to each dataset without the techniques described herein.

As an example, the summary information may relate to usage metrics. As described above, the different integration tiers may be associated with use of resources (e.g., virtualized resources). Thus, the usage metrics may indicate an extent to which use of a particular dataset justifies its associated use of resources. With respect to the particular dataset described above, the central user interface may present summary information indicating that the particular dataset is rarely utilized.

Advantageously, the central user interface may also enable rapid adjustments between integration tiers. For example, the system described herein may present graphical representations of the usage metrics. A user of the central user interface may therefore quickly ascertain a value associated with a dataset being assigned a particular integration tier. The system may additionally determine a recommendation regarding adjustment of an integration tier assigned to a dataset. This recommendation may be provided to the user, and the user may confirm whether the adjustment is to be implemented. In this way, the user of the central user interface may cause one or more datasets to be upgraded to a higher integration tier (e.g., to enable more complex functionality). The user may also cause one or more other datasets to be downgraded to a lower integration (e.g., to conserve usage of virtualized resources).

It should be appreciated that an entity may have multitudes of datasets stored on different networked devices, storage systems, and so on. It may be advantageous to have these datasets integrated with a same system, such that complex search functionality may be performed with respect to the datasets. However, enabling the search functionality to be performed on these datasets presents great technological problems. For example, each of the networked devices, storage systems, and so on, may utilize different schemas to search stored data. An example storage system may be a cloud-based storage system. In this example, the cloud-based storage system may provide one or more application programing interfaces (APIs) associated with searching. Another example storage system may be a networked database. In this example, the networked data base may respond to queries formatted according to a specific query language. While each storage system may be able to perform searching, causing these systems to be interoperable may be difficult.

Thus, the system described herein may provide for a centralized access point to the entity's datasets. As described above, certain of the datasets may provide important information to the entity. Thus, the entity may assign these datasets to a high integration tier within the hierarchy of integration tiers. In this way, the entity may unlock enhanced processing functionality, such as complex graphically-based search techniques, with respect to these datasets. Similarly, certain other datasets may be less utilized or of less important. Thus, the entity may assign these datasets to a lower integration tier.

Advantageously, as the above-described entity's datasets are utilized, the central user interface may inform the assignment of such integration tiers. As an example, a user associated with the entity may perform search functionality with respect to the integrated datasets. As an example of search functionality, the user may view graphical depictions of certain objects (e.g., a user, a device) included in records of one or more datasets. Example graphical depictions may include graphical representations of interrelations extracted from analyzing the objects. These interrelations may be automatically extracted by the system, based on the integration tiers of these datasets being higher than a threshold within the hierarchy. While searching, the user may ascertain, or the system may recommend, that an additional dataset may include information of importance. Thus, the user may cause the upward adjustment of the additional dataset's integration tier. In this way, the user may enable such complex graphical representations and quickly view how objects included in the additional dataset interrelate with the previously presented objects.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Overview

Figure 1:
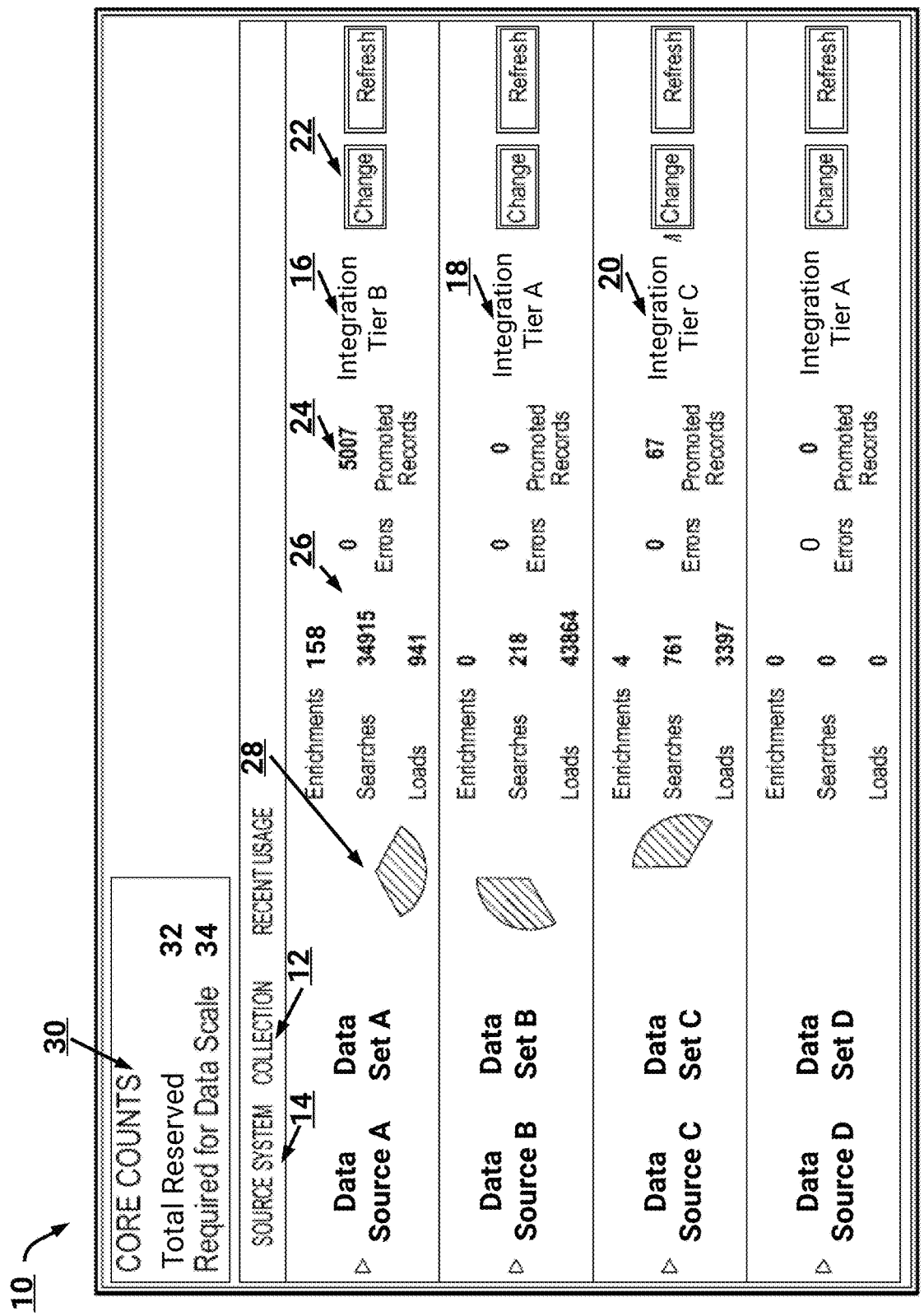
FIG. 1 illustrates an example user interface presenting summary information associated with integrated datasets.

This specification describes, among other things, techniques to centrally monitor datasets integrated with a system described herein (e.g., the data integration system 100). For example, a user interface may be utilized by a user to view summary information associated with integrated datasets. As will be described, the summary information may reflect usage metrics determined by the system. The usage metrics may be indicative of use of the integrated datasets, such as user interactions with the datasets. Examples of such usage metrics are described below, and illustrated in FIG. 6B. In this way, the system may present information usable to ascertain a value associated with each dataset integrated with the system.

A dataset may include information indicative of objects, such as user accounts, devices, systems, or any other thing which may be describable. The information may optionally be included in different records, such as in structured information (e.g., database tables) or unstructured information (e.g., text-based records). For example, a first dataset may include interactions of specific user accounts with respect to different systems. As another example, a second dataset may include specific features of the user accounts, such as group memberships, access control list information, and so on. An entity may utilize a user interface described herein to specify datasets to be integrated by the system. For example, a dataset may be stored by a server system operated by the entity. As another example, a dataset may be stored by a cloud-based system utilized by the entity. These example datasets may be integrated according to the techniques described herein.

The system may integrate an entity's datasets according to different integration tiers of a hierarchy of integration tiers. The hierarchy of integration tiers may reflect different degrees to which a dataset stored by an outside device or outside system is integrated with the system described herein. Each integration tier may additionally be associated with certain functionality which the system may perform with respect to an integrated dataset. As described herein, functionality may refer to search functionality. However, it should be appreciated that additional functionality may be referenced (e.g., processing functionality, machine learning functionality, and so on). For example, the system may be utilized to perform complex searching schemes across the integrated datasets. Certain integrated datasets may benefit from the system implementing enhanced search capabilities. Thus, for these integrated datasets, the system may more closely integrate the included information based on assignment of a higher integration tier.

A first example integration tier may indicate that an integrated dataset is stored outside of the system. In this example, the system may provide search queries for execution by an outside system storing the integrated dataset. For example, the system may provide a search query for execution by the outside system, and then receive results as determined by the outside system. In this way, a user can cause the searching of the integrated dataset with limited resources of the system. However, it should be appreciated that the search functionality enabled by the first example integration tier may be limited. For example, the user's query may be constrained according to the functionality enabled by the outside system. Additionally, the outside system may allow for limited exposure to its internal search functionality. As an example, the outside system may respond to particular application programming interface (API) calls. However, these APIs may not reflect the entirety of search functionality of which it is capable of performing. Thus, a higher integration tier may provide for superior performance.

A second example integration tier may cause a dataset stored outside the system to be indexed. Examples of an index may include an inverted index, a suffix tree, document-term matrix, and so on. The system may optionally perform an indexing process on the dataset. In this example, the system may obtain the dataset and generate one or more indices based on the dataset. The system may also optionally cause the generation of one or more indices (e.g., by an outside system,) or may receive the indices (e.g., from a user). Using an index, the system may enable enhanced search functionality with respect to the integrated dataset. For example, the index information may reflect features associated with objects identified in the integrated dataset. Thus, the system may quickly respond to search requests associated with specific objects. The system may also present graphical representations associated with each object, such as nodes connected by edges indicating relationships between objects. Further examples of search functionality will be described in more detail below.

A third example integration tier may cause a dataset to be fully stored by the system. Thus, the entirety of the information included in the dataset may be stored. In contrast to the second example integration tier, in which particular information (e.g., records) may be requested by the system for utilization in servicing a search request, the third example integration tier may store the information (e.g., locally). The system may therefore avoid network requests or calls to outside systems (e.g., via the internet). Advantageously, and with respect to the second and third example integration tiers, the system may provide consistent search functionality for integrated datasets assigned these integration tiers. In contrast, the first integration tier may rely upon search functionality which can be performed by outside systems.

Advantageously, and with respect to the first and second example integration tiers, as particular information (e.g., particular records) within an integrated dataset is utilized, the system may store the information (referred to herein as being 'promoted'). For example, the system may monitor the searching which is performed using the integrated datasets. As certain records are utilized, or returned to the system via outside systems in response to search queries, the system may optionally store these records. As an example, the system may store these records for a threshold period of time (e.g., one hour, one day, and so on). As another example, the system may store these records based on the records being utilized, or returned, greater than a threshold amount of times optionally within a threshold period of time.

As will be described, the user interface described herein may present a usage metric indicating a number of records promoted by the system for each dataset. An increase in this usage metric may correspond to an empirical determination as to the dataset's usefulness. For example, if the number of records promoted for a first dataset is high then a user of the user interface may ascertain that the first dataset stores records which are responsive, or useful, to search requests. Thus, the user may cause the integration tier for the first dataset to be adjusted upwards in the hierarchy. In this way, enhanced search functionality may be performed with respect to the first dataset. In contrast, if the number of records promoted for a second dataset is low, then the user may ascertain that the second dataset is less relevant to the user's searching or that search semantics may need to be improved to surface relevant records.

It should be appreciated that the storage, and processing, of integrated datasets may utilize resources of the system. The user interface described herein may enable an entity to reserve resources of the system. For example, the resources may reflect virtual processors, virtual memory, and so on, which may be assigned by the system to different entities. An increase in integration tier assigned to an integrated dataset may correspond to an increase in the utilized resources of the system. For example, certain enhanced search functionality may utilize substantial virtualized resources. Thus, and as will be described, the user interface described herein may present measures associated with resource usage. Based on the measures, a user of the user interface may adjust an integration tier assigned to a dataset upwards or downwards. For example, if a particular dataset is assigned a high integration tier, but its usage metrics indicate it is rarely being utilized, then the user may downgrade the integration tier. In this way, the user may conserve resources expended on the particular dataset.

FIG. 1 illustrates an example user interface 10 presenting summary information associated with integrated datasets 12. The user interface 10 may be an example of a user interface rendered by a user device utilized by a user. Example user devices may include a laptop, tablet, wearable device, computer, and so on. The user interface 10 may be generated by an application (e.g., an 'app') executing on the user device or may be associated with a web application implemented by a system. For example, the system may be the data integration system 100 described below, or may be a presentation system in communication with the data integration system 100.

As illustrated in FIG. 1, the datasets 12 integrated with a system (e.g., the data integration system 100) are presented. For example, dataset A is indicated as being obtained from data source A. Thus, the user of the user interface 10, or a different user associated with a same entity (e.g., company), selected dataset A for integration. For this dataset, a particular integration tier 16 (e.g., 'integration tier B') was selected. As described above, the integration tiers may be associated with certain functionality enabled by the system. For example, the integration tier B may be associated with greater functionality than 'integration tier A' 18, and less functionality than 'integration tier C' 20. As will be described in more detail below, the user may adjust the assigned integration tier 16. For example, the user may provide user input directed to user interface element 22 to cause adjustment of the integration tier 16.

For dataset A, the user interface 10 indicates there have been '5007' promoted records 24. The number of promoted records 24 may be determined by the system as a usage metric indicating use of dataset A. As described above, for integration tiers in which records are stored outside the system, the system may optionally cause certain records to be stored by the system. In this way, the system may be able to quickly access these records, extract information from the records, determine information from the records, and so on.

Without being constrained by way of example, it should be appreciated that promoting a record may represent a deep interaction with the record. For example, the system may promote a record based on monitoring a user's interactions with the record. In this example, the system may determine that the record was reviewed greater than a threshold number of times by the user. The system may also determine that the record was an integral part of a chain which led the user to complete searching. For example, the user may have viewed the record, and then pivoted based on the information included in the record to one or more other records which led to completion of the search. Completion of the search may be determined based on a time at which the user stopped searching, a time at which the user cause certain information to be downloaded on the user's device, and so on. Additionally, promoting a record may occur based on a user modifying the record in some way to add new information or work product. For example, modifying the record may represent enrichment which is described in more detail below with respect to usage metrics 26.

As an example of promoting a record, the system may receive a particular record from an outside system in response to a provided search request or query. The system may then promote the record, for example storing the record for a threshold period of time. Example periods of time may be a day, a week, until an end of a current searching session, and so on. As another example of promoting a record, the system may utilize index information associated with dataset A. For example, a user of the user interface 10 may implement a particular search of the datasets 12. In this example, the user may search for, or review information associated with, a particular object (e.g., a particular person, user account, user, and so on). The system may utilize the index information to identify records corresponding to the particular object. These identified records may be requested from an outside system, and then promoted upon receipt.

The user of the user interface 10 may thus determine a degree to which each of the datasets 12 has been of value in prior searches performed by the system. Since dataset A is indicated as having the greatest number of promoted records, the user may utilize the information to adjust the integration tier upwards (e.g., via user interface element 22). As will be described below, with respect to at least FIG. 7B, the user may select integration tier C to cause all records in dataset A to be promoted. This promotion may thus cause the records to be stored locally by the system. For example, the records may be stored in one or more databases, storage systems or subsystems, and so on, which are connected via local, or network, connections with the system.

The user interface 10 further includes additional example usage metrics 26. As will be described, the system may monitor use information associated with the datasets 12. The system may then generate usage metrics 26 based on the use information. An example of use may include user interactions with particular records included in a dataset. Another example of use may include user interactions with particular objects identified in records of a dataset. Another example of user may be based on user-performed searches which implicate, or otherwise utilize information from, a dataset.

In the illustrated example, the usage metrics 26 include an indication of a number of enrichments. An enrichment may indicate a number of times users have supplemented information included in records of dataset A. For example, as users perform searches of the datasets 12, the users may identify links, relationships, and so on, between records, objects, or other information included in the datasets 12. The users may then, for example, enrich information in a dataset. As an example, a user may indicate that a particular object is related to a different object. In this example, the user may view a graphical depiction of the objects (e.g., each object may be represented as a node). The user may then indicate a relation between two objects (e.g., the user may cause an edge to be created between two nodes). The system may then store this relation, and the dataset may thus be enriched. The enrichment usage metrics 26 may therefore serve as a quick visual identifier regarding actual user engagement, and benefit, which is provided by a dataset.

The usage metrics 26 may also indicate a number of searches performed that involved dataset A. The system may, for example, monitor the searches performed by different users, and identify a number a number which caused access to information included in dataset A. These searches may have expressly indicated that dataset A is to be searched, or the system may have automatically accessed the dataset A. Another example usage metric 26 includes a number of loads. The number of loads may indicate a number of times a record, or object identified in one or more records, was loaded based on searches being performed. For example, a search may cause access of information included in dataset A. The number of loads may indicate a number of records, or objects, which were returned in response to the search. Thus, the number of loads may provide a measure of use with respect to the information included in dataset A.

The user interface 10 further includes a graphical depiction 28 associated with the usage metrics 26. In the example of FIG. 1, the graphical depiction is a chart (e.g., a pie chart). An area encompassed by the pie may visually indicate an extent to which a particular usage metric indicates a type of use. For example, the graphical depiction 28 may indicate that data set A is associated with a high number of searches.

As described above, a user of the system may cause the reservation, or allocation, of resources of the system. For example, the system may have discrete resources which users of the system can reserve for their use. An example of a discrete resource may be a processor of the system. In this example, the processor may represent a hardware processor, or a core of a processor, or a virtualized processor. The different integration tiers may utilize different amounts of resources. For example, since integration tier A may provide queries to be executed by an outside system storing data, this integration tier may require a least amount of resources of the system. In contrast, integration tiers B and C may provide greater resources since search functionality may be performed by the system.

With respect to integration tier A, a user of the system may be constrained according to functionality enabled by the outside systems. Thus, searches being performed using datasets assigned integration tier A may have indeterminate searching abilities. For example, a first outside system may have limited search functionality (e.g., basic finds, joins, and so on). As another example, a second outside system may have more complex search functionality (e.g. Elasticsearch). Thus, it may be unclear to a user of the system an extent to which search functionality may be performed.

Therefore, integration tiers B and C may provide assurances to the user regarding the search functionality capable of being performed. For example, the system may store index information with respect to integration tier B. Thus, the system may have parsed information included a dataset and generated one or more indices. With respect to integration tier C, the system may store the entirety of the information included in a dataset. Thus, a user may perform complex searches with known search characteristics and functionality. For example, the system may provide information identifying the search functionality enabled by the system. In this way, it may be advantageous for a user of the system to adjust a dataset's assigned integration tier from integration tier A to integration tiers B or C.

Since the higher integration tiers (e.g., tiers B or C) may require additional resources, the user interface 10 can indicate summary information 30 associated with the resources. The summary information 30 indicates a number of cores 32 (e.g., hardware or virtualized processing elements) which are assigned to users of user interface 10. Additionally, the summary information 30 indicates a number of cores 34 being currently utilized. In the example of FIG. 1, the number of cores 34 being utilized is less than the number of assigned cores 32. Thus, the user of user interface 10 may ascertain that the reserved resources are being underutilized. This may provide an incentive for the user to adjust an integration tier of a dataset. The user may thus request that an integration tier be upgraded. The user interface 10 may optionally present an expected increase in the number of cores 34 which would be utilized. Thus, the user may confirm that the number of cores 34 being utilized would not exceed the number of assigned cores 32.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Integration Tier: A degree to which information included in a dataset, such as records included in the dataset, are integrated with a system (e.g., the data integration system 100). The integration tiers may form a hierarchy of integration tiers. Each integration tier within the hierarchy of integration tiers may be associated with respective functionality, such as search functionality. For example, a first integration tier may cause search requests, search queries, and so on, to be routed from a user to an outside system storing a dataset. The system may then receive results as generated by the outside system. As another example, a second integration tier may cause the included information to be fully stored by the system. Thus, the system may perform more complex analyses with respect to the information.

Object-Centric Data Model

To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
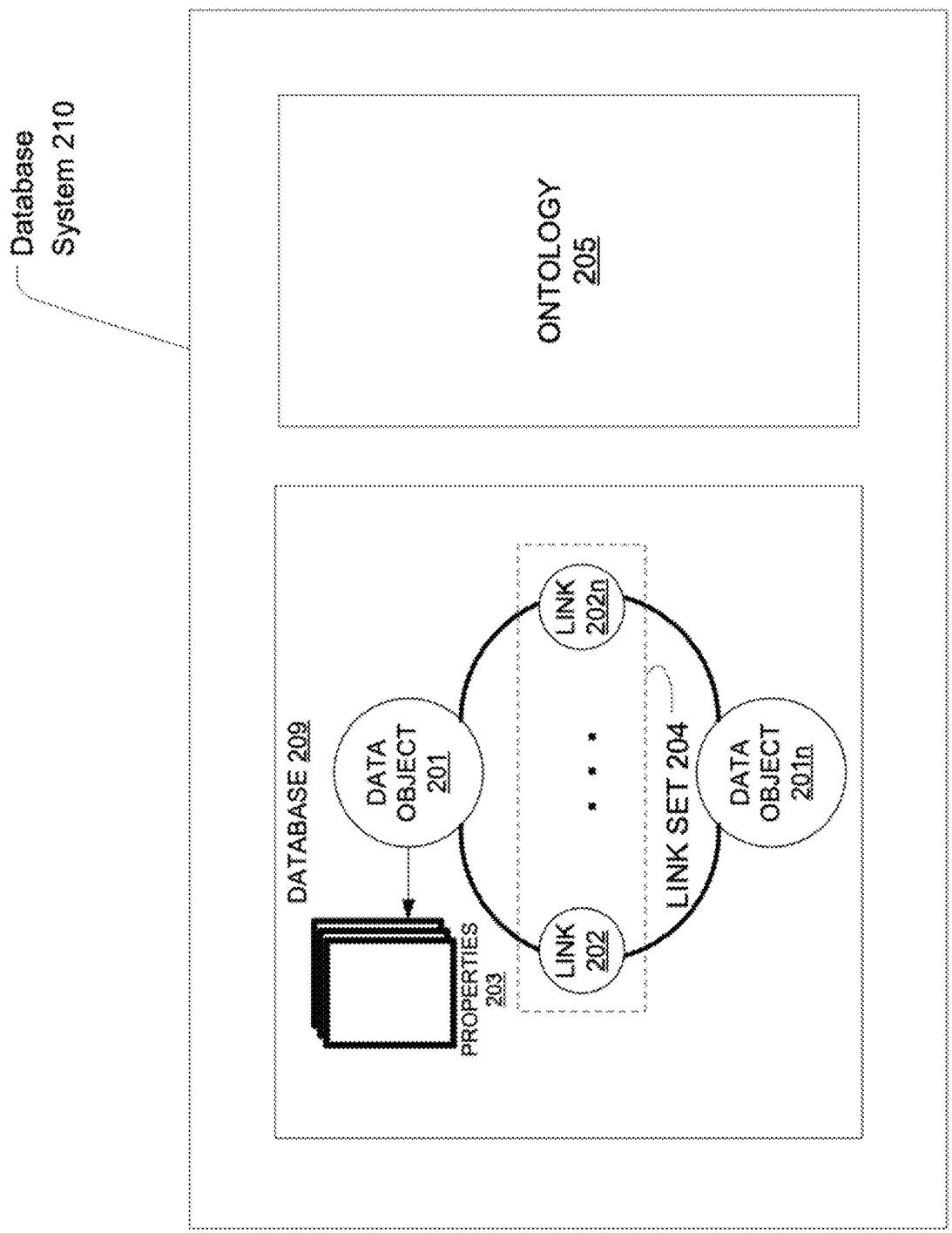
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
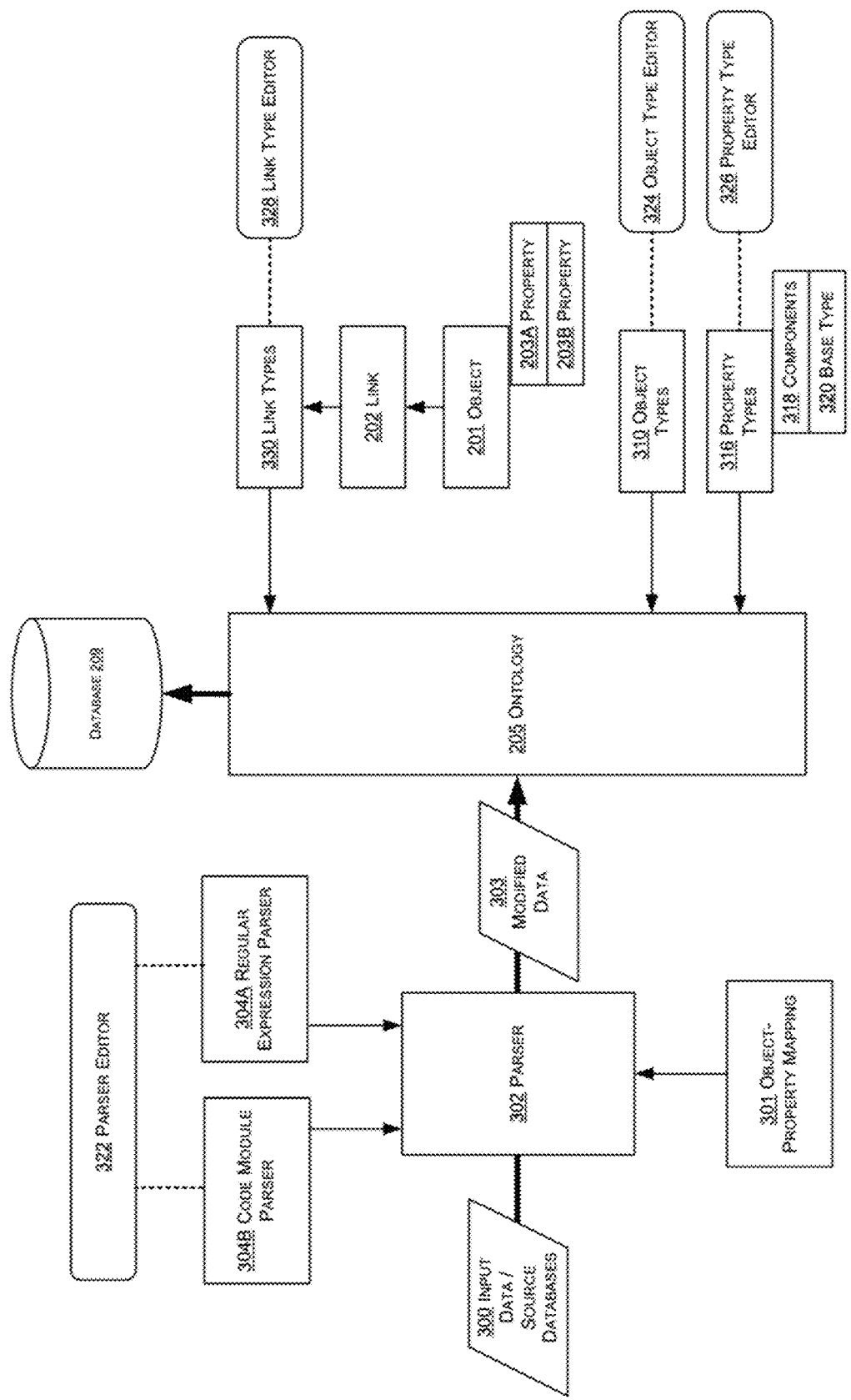
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Example Block Diagram

Figure 4:
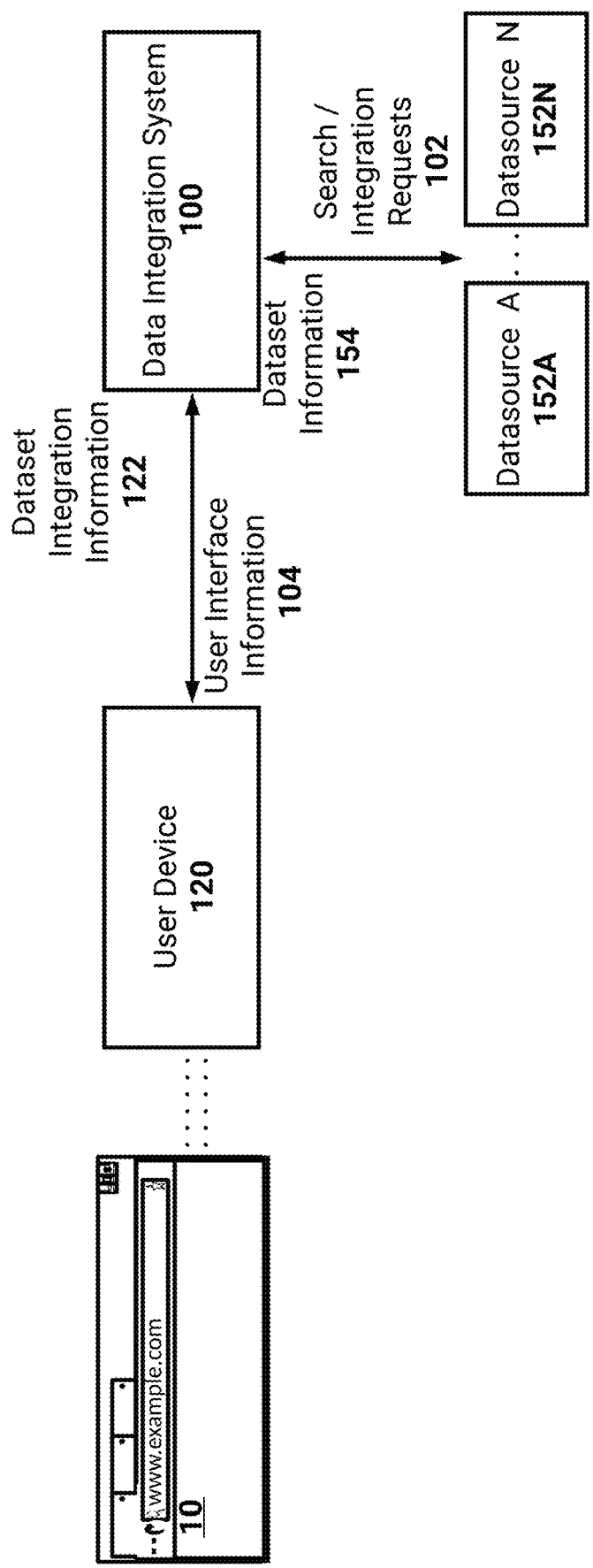
FIG. 4 illustrates a block diagram of an example data integration system in communication with a user device.

FIG. 4 illustrates a block diagram of an example data integration system 100 in communication with a user device 120. The data integration system 100 may be an example of a system of one or more computers, one or more virtual machines executing on a system of one or more computers, and so on. Optionally, the data integration system 100 may represent an on-premises system or on-premises software executing on a system. In this example, the system 100 may be under control of an entity which also controls datasets integrated with the system 100. Optionally, the data integration system 100 may represent a cloud-based system which may service a multitude of entities. For example, the data integration system 100 may implement a web application. In this example, users associated with an entity may access a web page to cause the integration of the entity's datasets with the data integration system 100.

As illustrated, a user device 120 may utilize a central user interface 10 to enable integrations of particular datasets. The central user interface 10 may therefore provide a holistic access point in which a user may integrate datasets, view summary information, perform searches, and so on. Since the integrations may be automatically performed by the data integration system 100, the user may avoid being required to create disparate integration pipelines. For example, the user may specify utilize the user interface 10 to specify locations at which the datasets are stored. As described above, the user interface 10 may be presented via a web page rendered on the user device 120. The user interface 10 may also be generated by the user device 120 executing an application (e.g., an 'app' obtained from an electronic application store).

As an example of integrating datasets, the user may interact with the user interface 10 to indicate selection of data sources A-N 152A-152N. The user device may then provide dataset integration information 122 reflecting the selected data sources A-N 152A-152N. The user may be required to provide authentication information (e.g., a user name, password, an authorization token, and so on) to enable the integration. The data integration system 100 may provide integration requests 102 to the data sources A-N, with the requests 102 comprising authentication information. Upon authorization by the data sources A-N, the user interface 10 may update to present datasets being stored by the data sources A-N. For example, the data integration system 100 may provide updated user interface information 104 to the user device 120. The user may then select from among these datasets, and the data integration system 100 may integrate any selected datasets.

An example data source A 152A may include a database, for example a database stored by an outside system. In this example, the data integration system 100 may obtain datasets using different interface schemes. An example interface scheme may include JDBC, ODBC, and so on. In addition, the data integration system 100 may obtain data via different integration tools. An example of an integration tool may include Extract, Transform and Load (ETL) tools. Such tools may target bulk movement of data between data systems. These tools may be designed for near real time application to application data sharing. Another example data source A 152A may include a cloud-based storage system. In this example, the user may provide authentication information and the data integration system 100 may route the authentication information via one or more application programming interface (API) calls of the cloud-based storage system. The user interface 10 may then update to reflect the datasets stored by the cloud-based storage system. In this way, the data integration system 100 may enable the integration of different datasets.

As described above, with respect to FIG. 1, the user of the user device 120 may additionally specify integration tiers to be assigned to each integrated dataset. The data integration system 100 may store, or obtain, information indicating search functionality which may be performed a data source A 152A. For example, and with respect to a lowest integration tier, the data integration system 100 may provide search request, queries, and so on, to data source A 152A. Data source A 152A may therefore perform any required processing to service received search requests, queries, and so on, and provide information 154 to the system 100 in response. During integration of the datasets associated with data source A 152A, the data integration system 100 may obtain information indicating search functionality the data source 152A may perform. As an example, the system 100 may be exposed to application programming interfaces (APIs) of the data source 152A. In this way, the system 100 may determine that particular API calls are associated with Elasticsearch. As another example, the system 100 may receive information from data source A regarding a schema, or form, associated with search queries or requests. Thus, the system 100 may utilize the received schema when creating search queries or requests to be provided data source A 152A.

With respect to higher integration tiers, the data integration system 100 may store information associated with one or more integrated datasets. For example, a particular integration tier may cause the entirety of information included in an integrated dataset to be stored by the data integration system 100. In this example integration tier, the data integration system 100 may thus store the information for rapid access to the information. As another example, a different integration tier may cause one or more indices to be generated based on information included in a dataset. An example index may include an inverted index. Thus, the data integration system 100 may store information identifying records which include references to individual objects. For example, the inverted index may indicate records storing information associated with a particular user account.

Subsequent to integration of the datasets, the data integration system 100 may enable performance of functionality with respect to the datasets. For example, a user of the user device 120 may perform searches that utilize information included in the datasets. The data integration system 100 may thus enable the searching according to respective integration tier assigned to the datasets. As described above, certain integration tiers may cause the data integration system 100 to store information associated with datasets. These integration tiers may provide a standardized suite of search functionality, which the user may leverage. Additionally, lower integration tiers may cause the data integration system 100 to route search requests to outside system for processing. For example, the system 100 may route the search requests to data source A-N.

Since searching may utilize information across these datasets, the data integration system 100 may advantageously perform the required back-end processing. For example, the user may perform searching with respect to a first dataset assigned a high integration tier. In this example, the data integration system 100 may thus directly access the stored information included in the first dataset. The user may then request that certain information found in the search be cross-referenced with a different dataset. For example, the different dataset may be assigned a lower integration tier. Thus, the data integration system 100 may intelligently create a search request 102 or query to cause the different dataset to be searched. As described above, the data integration system 100 may store API information, schema information, and so on, associated with data sources. Thus, the system 100 may create the search request 102 or query based on this stored information, and provide the search request 102 or query to a data source storing the different dataset. Upon receipt of search results, the data integration system 100 may then present the received information. The system 100 may also utilize the received information for further processing. With respect to the example of cross-referencing described above, the system 100 may thus determine whether the first dataset references information included in the different dataset.

Example Flowcharts/User Interfaces

Figure 5:
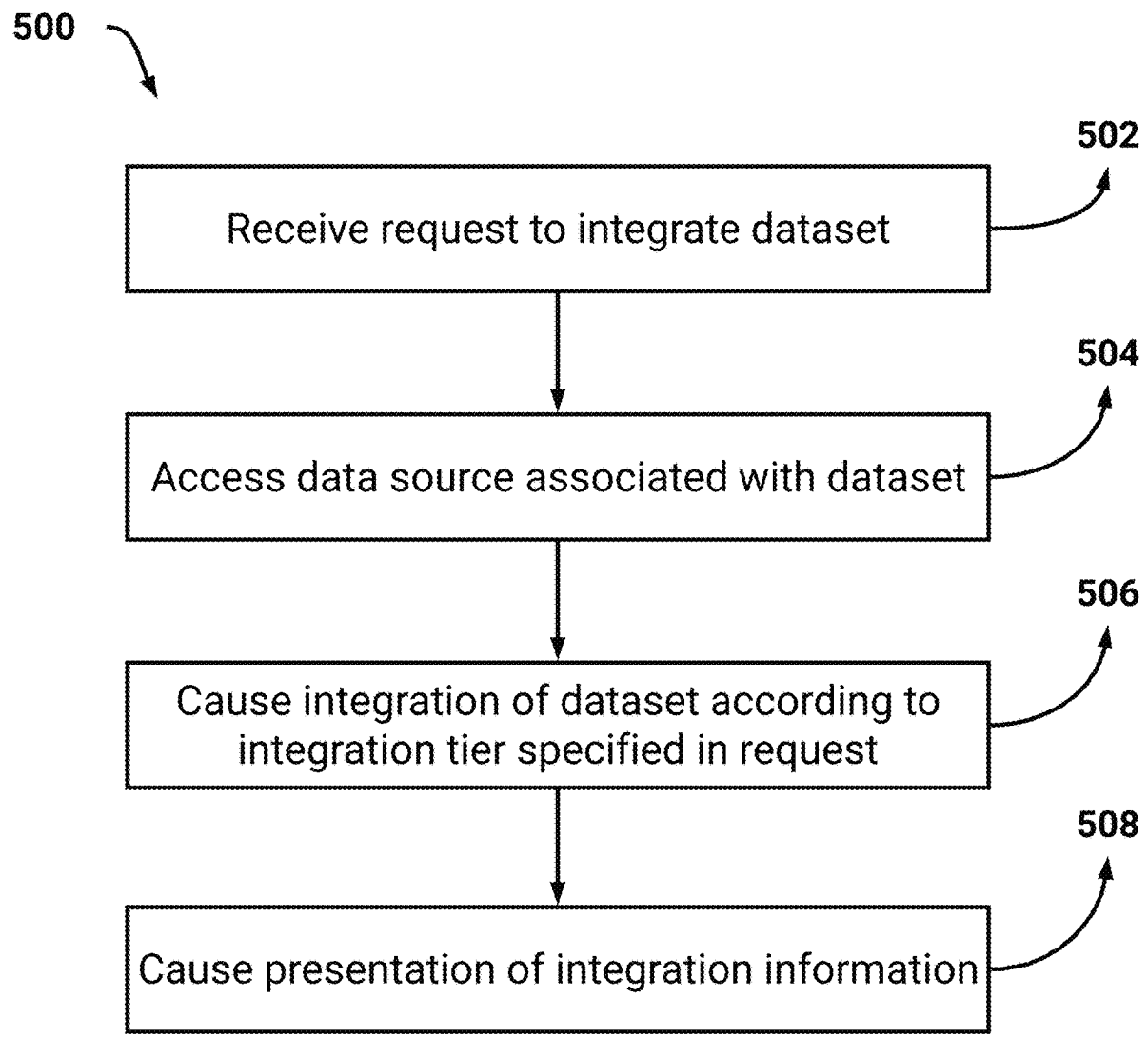
FIG. 5 illustrates a flowchart of an example process for causing integration of a dataset via a central user interface.

FIG. 5 illustrates a flowchart of an example process 500 for causing integration of a dataset via a central user interface. For convenience, the process 500 will be described as being performed by a system of one or more computers (e.g., the data integration system 100).

At block 502, the system receives a request to integrate a dataset. As described above, the system may respond to user input provided to a central user interface presented via a user device. The user input may indicate that a particular dataset is to be integrated with the system.

At block 504, the system accesses a data source associated with a dataset. The request may identify a particular data source which is to be accessed. For example, the data source may be an outside system (e.g., server system) which stores one or more datasets. Thus, the request may identify a network location associated with the data source. The request may further include authentication information which the system may utilize to access the data source. The system may then cause the integration of the dataset identified in the request.

Optionally, and as described in FIG. 4, the system may access the data source and obtain indications of datasets available for integration. The system may then update the central user interface to present indications of the datasets, and the system may receive selections of one or more datasets.

At block 506, the system integrates a dataset according to an integration tier. The system may receive information indicating an integration tier to be assigned to the dataset. For example, the user of the central user interface may select from among available integration tiers. With respect to a lower integration tier, the system may store information enabling subsequent access to the dataset. For example, the stored information may enable search requests or queries to be provided to the data source for execution.

With respect to a higher integration tier, the system may generate one or more indices for storage by the system. In this example, the system may obtain a copy of the dataset from an associated data source, and generate the indices. The system may then discard the copy, and may periodically generate new indices. For example, the system may update the indices every week, month, and so on. The system may also periodically poll the data source to identify whether any changes have been made to the dataset. Optionally, the system may provide code (e.g., executable code) to the data source for execution. This code may cause the generation of the indices, such that the system may avoid performing the processing locally. The system may then receive the generated indices.

Additionally, the system may also store the information included in a dataset. For example, the system may store a copy of the dataset. Similar to the above, the system may periodically request a new version of the dataset from an associated data source. The system may also poll the data source to identify whether any changes have been made.

At block 508, the system presents information indicating completion of the integration. For example, the system may update the central user interface to reflect the completion. Optionally, the system may generate notifications to be provided to one or more users regarding the completion. Since integration may take time (e.g., due to bandwidth constraints, processing constraints, and so on), the system may advantageously notify users upon completion.

Figure 6A:
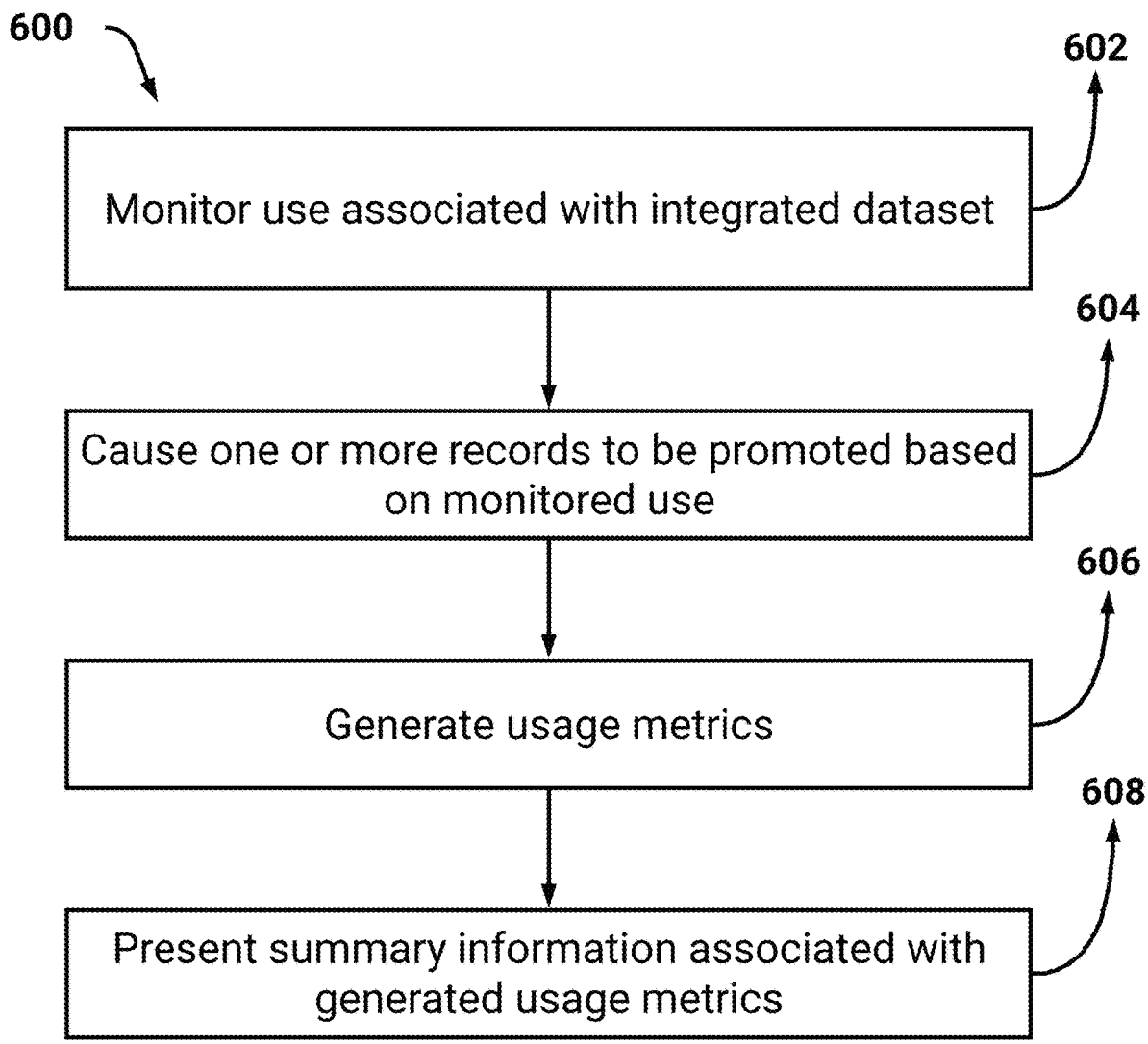
FIG. 6A illustrates a flowchart of an example process for presenting summary information associated with an integrated dataset.

FIG. 6A illustrates a flowchart of an example process 600 for presenting summary information associated with an integrated dataset. For convenience, the process 600 will be described as being performed by a system of one or more computers (e.g., the data integration system 100).

At block 602, the system monitors use associated with an integrated dataset. As described herein, users may interact with integrated datasets. For example, the users may perform searching that utilizes information included in the integrated datasets. As an example of searching, a user may request that the system present a graphical representation of objects identified in a dataset. As another example, a user may indicate that one or more filters, joins, and so on, are to be performed using information included in a dataset. The system may thus perform these disparate searches, and monitor use of the dataset. For example, the system may monitor a number of searches which utilize information included in the dataset. As another example, the system may monitor a number of times information included in the dataset has been exported, graphically presented, and so on. As another example, the system may monitor a number of times information included in the dataset has been supplemented or enhanced. In this example, one or more users may expand upon the information included in the dataset. For example, the users may identify relations between objects, or the users may create notes for storage in the dataset, and so on.

At block 604, the system causes one or more records to be promoted. As information included in the dataset is accessed, such as records, the system may determine that certain records are to be stored (e.g., locally by the system). Determining that a record is to be promoted may be based on an amount of time a user reviewed or interacted with the record. The determination may also be based on a measure of interaction with the record. For example, the system may present a graphical depiction of the record. The system may then monitor user input provided to the graphical depiction. As an example, the user may select certain terms within the record. As another example, the user may scroll through the graphical depiction of the record. The system may then determine that the measures of interaction exceeds one or more thresholds and promote the record. Additional examples of determining whether a record is to be promoted are described above, with respect to at least FIGS. 1 and 4.

At block 606, the system generates usage metrics. As described in FIG. 1, the system may determine usage metrics related to use of the dataset. An example usage metric may include a number of times a dataset was utilized in searches. Another example usage metric may include a number of times records in the dataset were supplemented, or enhanced, with information from users performing the searches. An entity may thus determine, based on the usage metrics, whether the dataset justifies its use of resources (e.g., virtualized resources). As will be described below, with respect to FIG. 7B, a user may adjust an integration tier assigned to the dataset. This adjustment may be based on the determined usage metrics.

At block 608, the system presents summary information associated with the usage metrics. To provide easy to digest information regarding use of each dataset, the system may present summary information. For example, the system may present user interface 10 illustrated in FIG. 1. A user may thus review this summary information to quickly ascertain an extent to which each dataset is being utilized or an extent to which each dataset is providing a benefit for searching.

Figure 6B:
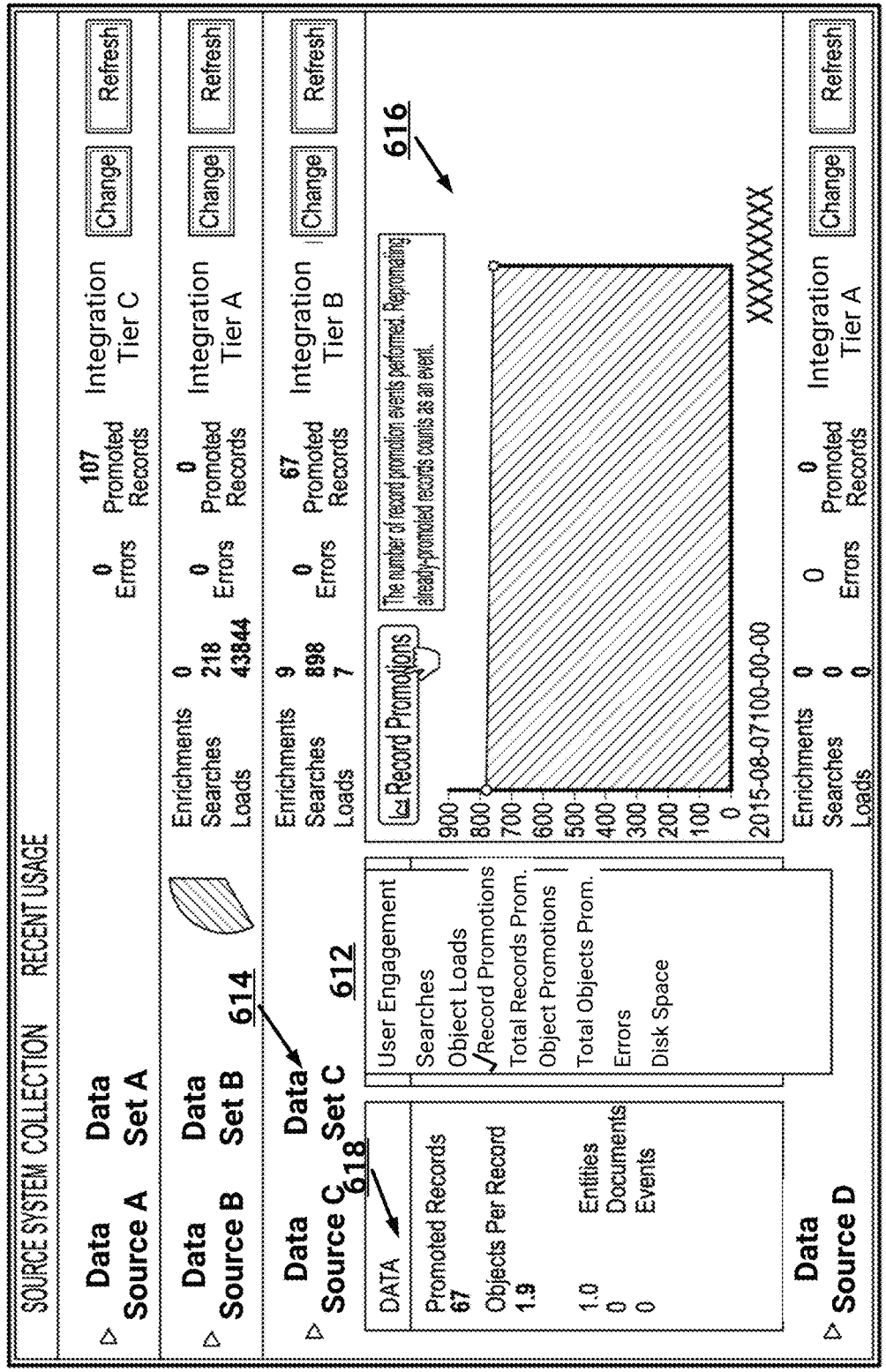
FIG. 6B illustrates an example user interface presenting examples of usage metrics associated with an integrated dataset.

FIG. 6B illustrates an example user interface 610 presenting examples of usage metrics 612 associated with an integrated dataset 614. The user interface 610 may be presented to a user based on receipt of user input directed to a particular dataset included in user interface 10 (e.g., illustrated in FIG. 1). In the example of FIG. 6B, a user has selected data set C 614, and the user interface 610 has updated to present detailed information related to data set C 614.

The detailed information may include usage metrics 612 available for selection, and a graphical depiction 616 of a selected usage metric. In the illustrated example, the user has selected 'record promotions', indicating a number of records which have been promoted over a time period. Another example usage metric 612 includes user engagement. User engagement may be based on measures associated with user interactivity with the dataset 612. For example, user engagement may be a weighted sum, or weighted average, associated with two or more of the other usage metrics 612. As an example, user engagement may indicate a combination of a number of searches performed using the dataset 614 and a number of records promoted.

Another example usage metric may include a number of objects loaded. As described above, the records may indicate information associated with objects. Thus, specific objects may be loaded. For example, the system may aggregate information associated with a particular object. The aggregated information may be presented, such that a user view a single view of the particular object. Another example usage metric may include a number of objects promoted. Similar to the description of promoting records, the system may promote an object. For example, the system may store aggregated information associated with the object.

User interface 610 further includes detailed information related to data 618 associated with the dataset 612. For example, the data may indicate a number of promoted records (e.g., within a particular time period). The data 618 may also indicate a measure of central tendency of objects indicated in records of the dataset 612. For example, the measure of central tendency may an average number of objected identified in records. This measure may be utilized by the user to ascertain how dense each record is.

Figure 7A:
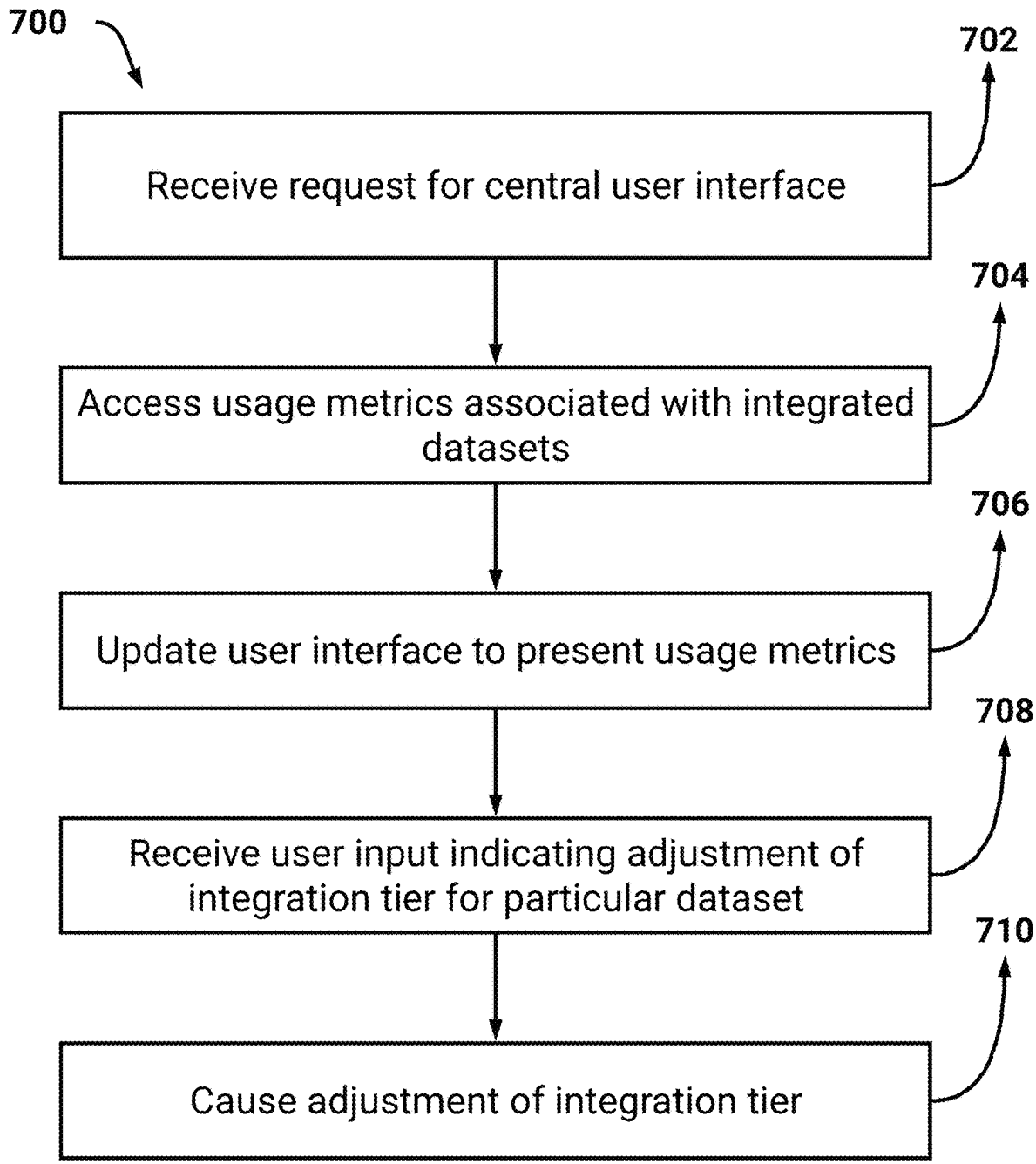
FIG. 7A illustrates a flowchart an example process for adjusting an integration tier assigned to an integrated dataset.

FIG. 7A illustrates a flowchart an example process 700 for adjusting an integration tier assigned to an integrated dataset. For convenience, the process 700 will be described as being performed by a system of one or more computers (e.g., the data integration system 100).

Figure 7B:
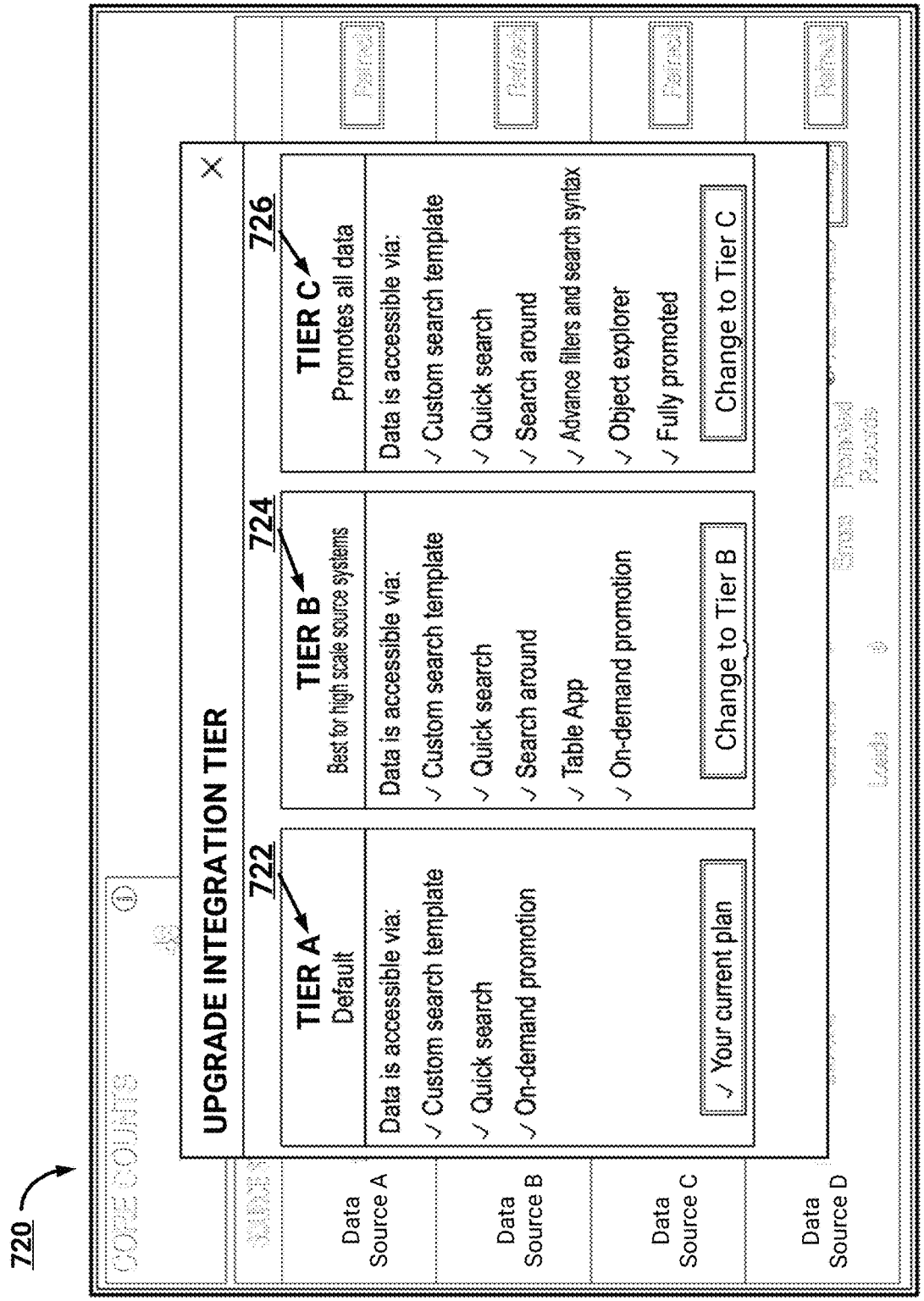
FIG. 7B illustrates an example user interface enabling selection of an updated integration tier.

At block 702, the system receives a request for access to a central user interface. As described above, a user may utilize a user device to access the central user interface described herein. An example of the central user interface is illustrated in FIGS. 1, 6B, and 7B. Thus, the user's user device may provide a request for access, such as via a browser executing on the user device.

At block 704, the system accesses usage metrics associated with integrated datasets. As described above, the system may determine usage metrics associated with use of datasets integrated with the system. At block 706, the system updates the user interface to present the usage metrics. Example of presenting usage metrics is illustrated in FIGS. 1 and 6B.

At block 708, the system receives user input indicating adjustment of an integration tier assigned to a particular dataset. Reference will now be made to FIG. 7B, which illustrates an example user interface 720 enabling selection of an updated integration tier. The user may select a user interface element associated with adjusting an integration tier. For example, the user may select user interface element 22 illustrated in FIG. 1, and the user interface may update to present user interface 720.

In the example of FIG. 7B, the user interface 720 indicates that the current integration tier assigned to the particular dataset is 'tier A' 722. This integration tier may indicate that the information included in the particular dataset is stored by an outside system. User interface 720 includes indications search features enabled by this integration tier. The user interface 720 further includes search features enabled by increasing integration tiers within a hierarchy of integration tiers. For example, integration tier B 724 indicates that it is 'best for high scale source systems'. As described above, this integration tier 724 may cause the system to store index information associated with the particular dataset. Additionally, integration tier C 726 includes further search features and indicates that it causes promotion of all data included in the particular dataset.

The user of user interface 720 may thus select a new integration tier, and the system may implement the adjustment. For example, if the user selects integration tier C 726, the system may obtain a copy of all information included in the particular dataset. The system may additionally generate index information for the copy. In an example in which the user downgrades an integration tier, the system may discard any stored data associated with an associated dataset.

In some embodiments, the system may determine recommendations regarding adjustments of integration tiers. These recommendations may be based on the determined usage metrics. For example, the system may determine that a large dataset utilizes greater than a threshold quantity of resources (e.g., virtualized cores) but that the large datasets usage metrics are less than one or more thresholds. This may indicate that the large dataset is consuming resources, but not providing sufficient benefit to justify its resources. Thus, the system may recommend (e.g., via the central user interface described herein) that the integration tier assigned to the large dataset be downgraded. As another example, the system may determine that a dataset may benefit from an upgrade of its integration tier. For example, the system may determine that its usage metrics exceed one or more thresholds. The system may also determine that there are sufficient reserved resources to implement the upgrade. Optionally, the system may perform a balancing process. For example the system may recommend that a dataset be downgraded while another dataset be upgraded. In this way, users of the system may ensure peak search performance within their reserved resources.

With respect to FIG. 7A, at block 710 the system may cause adjustment of the integration tier. As described above, a user may indicate adjustment of the integration tier. The system may then adjust the integration tier accordingly.

Notification Module

In some embodiments, the alerts and/or notifications (e.g., as described above) are automatically transmitted to a user device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
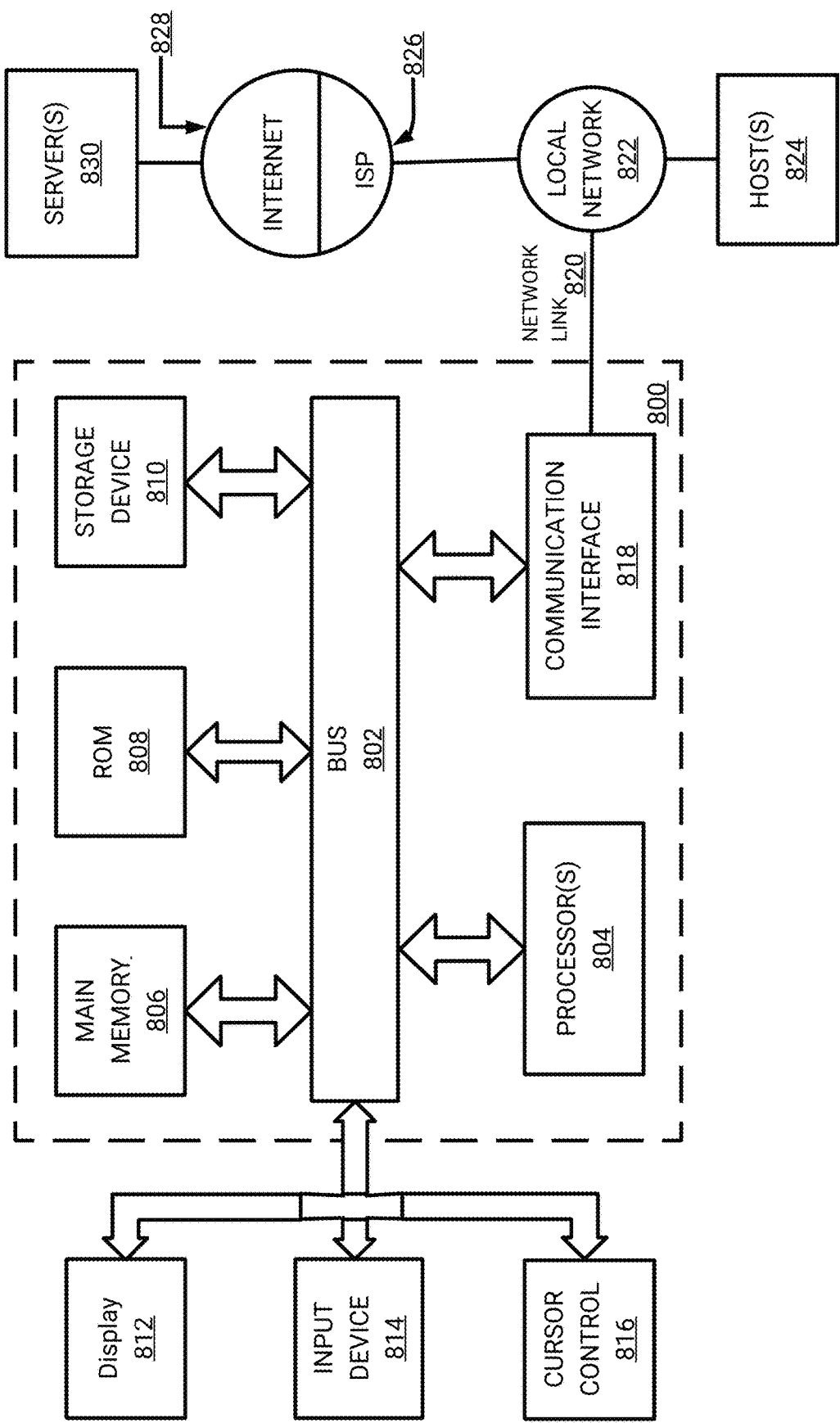
FIG. 8 illustrates a computer system with which certain methods discussed herein may be implemented.

For example, FIG. 8 is a block diagram that illustrates a computer system 800 upon which various embodiments may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor

804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computerized method comprising:
    integrating, by a system, a plurality of datasets according to respective integration tiers of a plurality of integration tiers,
    wherein a first integration tier causes a first index associated with a first dataset to be stored by the system, wherein the first dataset is stored by an outside device or outside system, wherein information included in the first dataset is returned to the system by the outside device or outside system in response to search requests, and wherein a second integration tier causes a second index associated with a second dataset, and the second dataset, to be stored by the system; and
    causing presentation, by the system and via a user device, of an interactive user interface associated with the integrated datasets, wherein the interactive user interface:
        presents summary information associated with the integrated datasets, the summary information specifying which of the plurality of integration tiers are assigned to individual datasets of the plurality of datasets, wherein the assignments include one of the first index or the second index,
        wherein the interactive user interface is configured to enable adjustment of assignment of a particular dataset to a different integration tier.

2. The method of claim 1, wherein the integration tiers form a hierarchy of integration tiers associated with increasing search functionality.

3. The method of claim 1, wherein the interactive user interface is configured to present an overlay which, in response to user input, causes adjustment of assignment of the particular dataset to a different integration tier.

4. The method of claim 1, wherein the summary information further indicates usage metrics associated with use of resources of the system.

5. The method of claim 4, wherein a particular usage metric indicates enrichment of a dataset, and wherein enrichment indicates a number of times users have supplemented information included in records of the dataset.

6. The method of claim 1, wherein the particular dataset stores information associated with objects, and wherein one or more of the objects are promoted to the different integration tier.

7. The method of claim 1, wherein the interactive user interface is configured to present information indicative of resource utilization of the system by individual datasets.

8. The method of claim 1, wherein the system is triggered to store the particular dataset in response to user input enabling the adjustment to the different integration tier.

9. A system comprising one or more processors and non-transitory computer storage media storing instructions that when executed by the processors, cause the processors to perform operations comprising:
    integrating a plurality of datasets according to respective integration tiers of a plurality of integration tiers,
    wherein a first integration tier causes a first index associated with a first dataset to be stored, wherein the first dataset is stored by an outside device or outside system, wherein information included in the first dataset is returned by the outside device or outside system in response to search requests, and wherein a second integration tier causes a second index associated with a second dataset, and the second dataset, to be stored; and causing presentation, via a user device, of an interactive user interface associated with the integrated datasets, wherein the interactive user interface:
- presents summary information associated with the integrated datasets, the summary information specifying which of the plurality of integration tiers are assigned to individual datasets of the plurality of datasets, wherein the assignments include one of the first index or the second index,
- wherein the interactive user interface is configured to enable adjustment of assignment of a particular dataset to a different integration tier.

10. The system of claim 9, wherein the integration tiers form a hierarchy of integration tiers associated with increasing search functionality.

11. The system of claim 9, wherein the interactive user interface is configured to present an overlay which, in response to user input, causes adjustment of assignment of the particular dataset to a different integration tier.

12. The system of claim 9, wherein the summary information further indicates usage metrics associated with use of resources of the system.

13. The system of claim 12, wherein a particular usage metric indicates enrichment of a dataset, and wherein enrichment indicates a number of times users have supplemented information included in records of the dataset.

14. The system of claim 9, wherein the particular dataset stores information associated with objects, and wherein one or more of the objects are promoted to the different integration tier.

15. The system of claim 9, wherein the interactive user interface is configured to present information indicative of resource utilization of the system by individual datasets.

16. Non-transitory computer storage media storing instructions that when executed by a system of one or more processors, cause the processors to perform operations comprising:
- integrating a plurality of datasets according to respective integration tiers of a plurality of integration tiers,
- wherein a first integration tier causes a first index associated with a first dataset to be stored, wherein the first dataset is stored by an outside device or outside system, wherein information included in the first dataset is returned by the outside device or outside system in response to search requests, and wherein a second integration tier causes a second index associated with a second dataset, and the second dataset, to be stored; and
- causing presentation, via a user device, of an interactive user interface associated with the integrated datasets, wherein the interactive user interface:
  - presents summary information associated with the integrated datasets, the summary information specifying which of the plurality of integration tiers are assigned to individual datasets of the plurality of datasets, wherein the assignments include one of the first index or the second index,
  - wherein the interactive user interface is configured to enable adjustment of assignment of a particular dataset to a different integration tier.

17. The computer-readable media of claim 16, wherein the integration tiers form a hierarchy of integration tiers associated with increasing search functionality.

18. The computer-readable media of claim 16, wherein the interactive user interface is configured to present an overlay which, in response to user input, causes adjustment of assignment of the particular dataset to a different integration tier.

19. The computer-readable media of claim 16, wherein the summary information further indicates usage metrics associated with use of resources of the system.

20. The computer-readable media of claim 16, wherein the particular dataset stores information associated with objects, and wherein one or more of the objects are promoted to the different integration tier.

* * * * *

UNITED STATES PATENT AND TRADEMARK OFFICE
CERTIFICATE OF CORRECTION

PATENT NO. : 12,197,457 B2
APPLICATION NO. : 17/934493
DATED : January 14, 2025
INVENTOR(S) : Joel Ossher It is certified that error appears in the above-identified patent and that said Letters Patent is hereby corrected as shown below:

In the Claims

Column 30, Line 23, Claim 17, delete "computer-readable media" and insert -- computer storage media --.

Column 30, Line 26, Claim 18, delete "computer-readable media" and insert -- computer storage media --.

Column 30, Line 31, Claim 19, delete "computer-readable media" and insert -- computer storage media --.

Column 30, Line 34, Claim 20, delete "computer-readable media" and insert -- computer storage media --.

Signed and Sealed this
Twenty-ninth Day of April, 2025

Coke Morgan Stewart
*Acting Director of the United States Patent and Trademark Office*